3,453,919

TAPE PUNCHING MECHANISM

Kurt Ehrat, Zurich, and Gerhard Zuehlke, Geroldswil, Zurich, Switzerland, assignors to Ciba Limited, Basel, Switzerland, a company of Switzerland Filed Jan. 23, 1967, Ser. No. 611,140
Claims priority, application Switzerland, Feb. 8, 1966, 1,743/66
Int. Cl. B26f *1/04;* B26d *5/08*
U.S. Cl. 83—589 13 Claims

ABSTRACT OF THE DISCLOSURE

A tape punching mechanism comprising at least one punch, preferably a row of two or more punches, arranged to punch holes into a tape passing between the punches and a die plate formed with as many holes as there are punches; the punches are mounted above the die plate for cooperation with the holes by leaf springs attached between the punches and a fixed support; the leaf springs are arranged in pairs and diverge from a punch to the support when viewed perpendicular to the die plate while the springs are spaced apart from one another a distance at least equal to the working stroke of the punch in the direction the punch can move.

Figure 1:
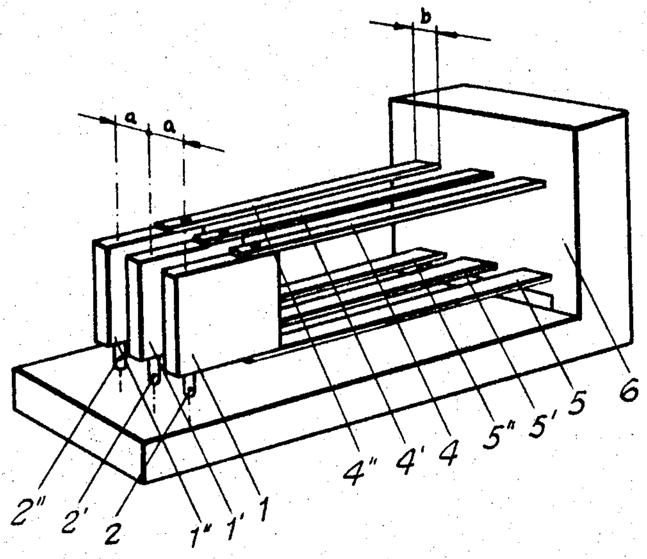

This invention relates to a tape punching mechanism for a tape punching machine in which, for example, two or more punches are disposed in alignment across the width of a tape to be punched. In particular, the invention relates to an arrangement by which the punches are resiliently held and guided by leaf springs to which they are attached.

In such tape punching machines, the holes that are to be punched into the tape across the width of the tape in each line are usually punched in one operation. The number of punches that is provided corresponds to the number of longitudinal rows in which holes are to be punched into the tape, said punches being disposed on both sides or, more commonly, since this is structurally easier to effect, on one side of the tape, i.e., above the top of the tape. Each punch is secured to a holder and each holder is attached to one end of each of a plurality of springs of which the other ends are rigidly held in fixed support means. Since the lateral spacing of the rows of holes and hence the centre spacing of the several punches is standardised at one tenth of an inch, the leaf springs lack the necessary lateral rigidity for locating the punches precisely. For structural reasons it is often impossible to divide the leaf springs into two groups of alternate springs rigidly held in support means which precede the punches and follow the punches in tape feeding direction. For instance, some modern punching machines comprise two complete sets of punches adapted to punch two consecutive lines of holes across the width of the tape simultaneously.

In order to improve the lateral rigidity of punch location in such an arrangement it has already been proposed to stabilise each of the punches or punch holders by providing supplementary guide means. However, such supplementary guide means require lubrication and this introduces the risk of the tape being spattered with oil. Moreover, in high speed tape punching machines the guide means are subject to considerable wear and in course of time the location of the punches likewise tends to become increasingly slack.

In order to reduce the force that must be applied to the punches for operating the same the leaf springs must be of adequate length and they must be much longer than they are wide. If, as is the case in a conventional punch suspension, each punch holder is attached to two leaf springs extending in parallel, this will improve the lateral stability of the system but it is still insufficient to meet the demands of a modern high speed punching machine which necessitates a suspension of considerable lateral stiffness.

It is therefore an object of the present invention to provide an arrangement for the suspension of the punches in tape punching machines, which is laterally very much stiffer and in which the stability of punch location is substantially improved.

According to the present invention there is provided a tape punching mechanism, comprising at least one punch member, a die plate formed with as many holes as there are punch members, each hole being intended to receive a respective punch member, support means associated with said die plate, and leaf spring means attached between said support means and each punch member and movably mounting each punch member at a location where it can cooperate with its respective hole in said die plate, said leaf spring means for each punch member comprising at least two pairs of leaf springs of which each pair, when viewed in a direction substantially perpendicular to the die plate forms a V diverging from said punch member to the points of attachment to said support means, and all said leaf springs being spaced apart from one another in the direction of movement of the punch member by a distance which is at least equal to the length of the working stroke of the punch member.

Where the mechanism comprises two or more punch members, corresponding leaf springs associated with different punch member lie in substantially the same plane. Preferably leaf springs contained in the same planes are also parallel. Furthermore, the spacing of the points of attachment to the support means of each of said pairs of leaf springs exceeds the centre distance between neighbouring punch members.

This disposition of the suspending springs ensures that the lateral location of the punch members is precise, without the need of providing supplementary aids, such as additional guide means. Consequently the tolerances between the punch members and the cooperating holes in the die plate can be reduced. A further reduction of these tolerances can be achieved if all the leaf springs are held in their fixed means of support to extend at an angle upwards or downwards in relation to the face of the die plate, according to whether their points of fixation are located above or below the plate, the magnitude of the angle being so chosen by reference to the length of the stroke of the punch member and the free length of the springs that at one level of the punch inside the cooperating hole in the die plate the tangent of the path of the punch member is parallel to the axis of the hole, that the axis of the punch member is always parallel to the axis of the hole and that at the above mentioned level the latter two axes coincide.

Figure 2:
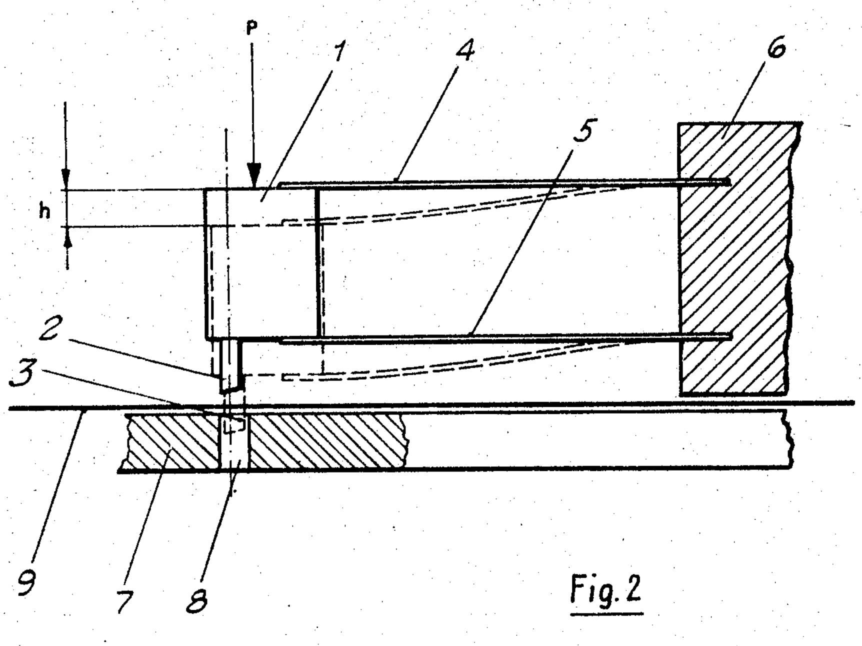
Figure 3:
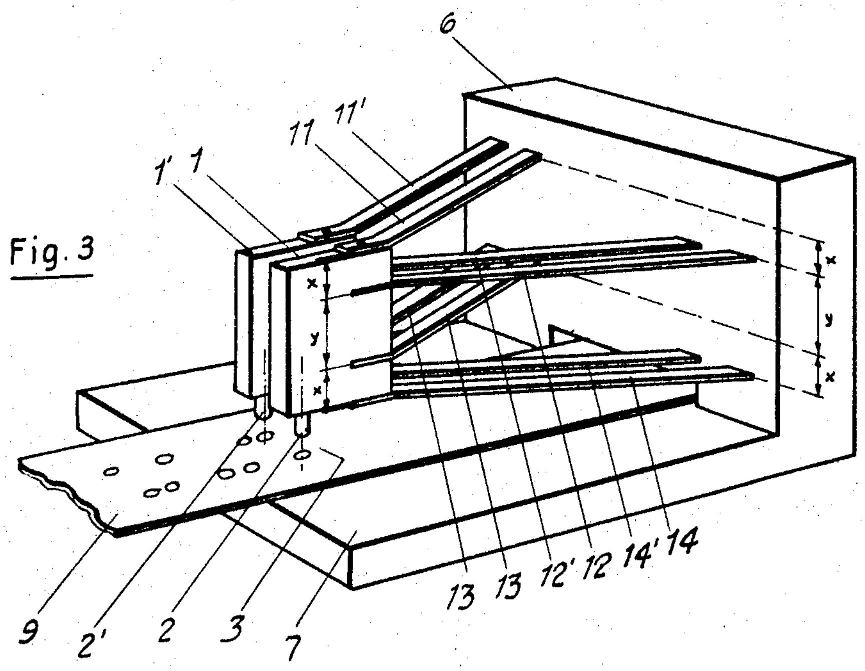
Figure 4:
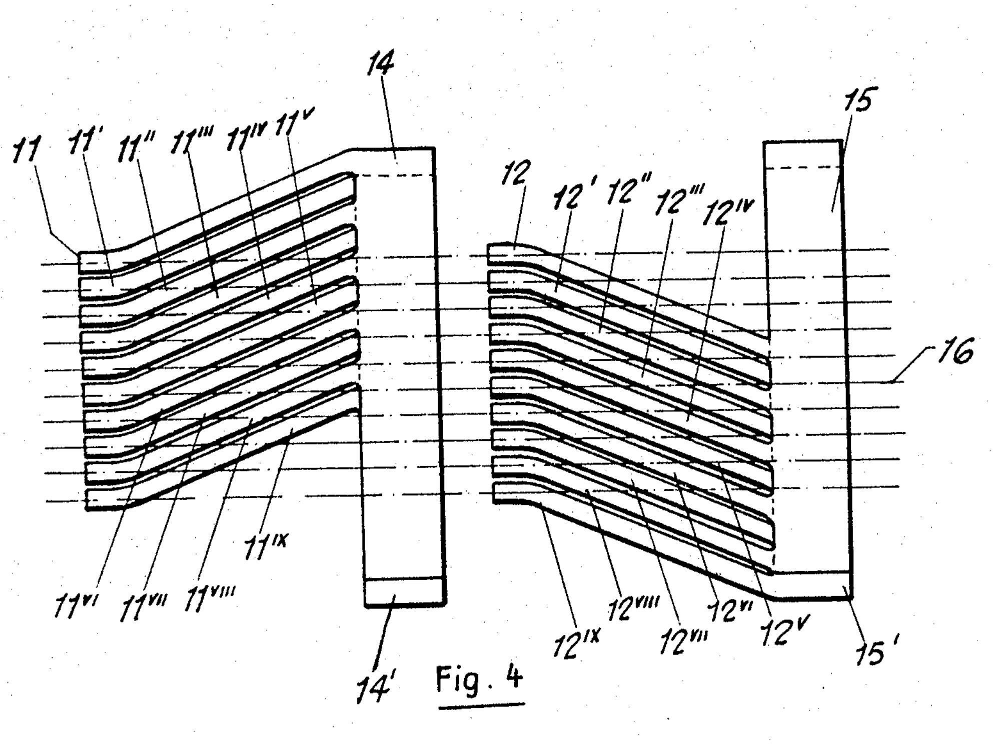
Figure 6:
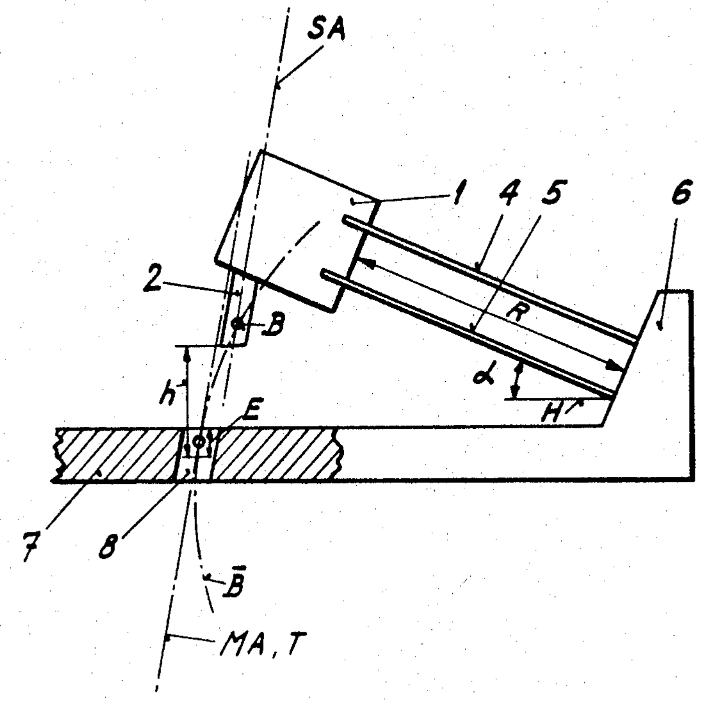

For a better understanding of the invention illustrative and nonlimtiing embodiments thereof will be hereinafter described in particular with reference to the accompanying drawings, in which:

FIG. 1 is a perspective representation of a conventional suspension of punches by leaf springs, FIG. 2 is a side elevation of the arrangement according to FIG. 1, FIG. 3 is a perspective view of an embodiment of a suspension of a punch by leaf springs constructed in accordance with the present invention, FIG. 4 is a plan view of a leaf spring system in the form of a comb, FIGS. *5a* and *5b* are perspective views of two further embodiments of a suspension arrangement according to the invention, and FIG. 6 is a part sectional side elevation of yet a further embodiment of the invention in which the springs are placed at an angle in relation to a die plate.

With reference first to FIG. 1 which represents a conventional arrangement of leaf springs for suspending punches, the punches 2, 2′, 2″ are let into block-shaped punch holders 1, 1′ and 1″ respectively, each punch hodler being attached to a pair of parallel vertically aligning leaf springs 4, 5; 4′, 5′ and 4″, 5″ respectively and all the leaf springs being rigidly held in a common fixing block 6. The free ends of the two leaf springs of each pair firmly embrace one of the punch holders 1, 1′ and 1″. Instead of the leaf springs thus embracing the punch holders, they could naturally be attached to the holders in some alternative suitable way.

The centre spacing *a* of neighbouring punch holders is standardised at $\frac{1}{10}$ inch. This spacing determines the maximum permissible width *b* of the blades of the springs which in practice is usually between about 0.08 and 0.09″. Since the length of each spring is well over one inch the relative width of the springs is very narrow, and the lateral rigidity of the resultant suspension is insufficient to prevent relatively larger lateral deflections in practice.

FIG. 2 is a sectional side elevation of such a system of springs. When a force P is applied to the punch holder 1, the leaf springs 4 and 5 bend downwards as indicated by dashed lines in the drawing and the punch holder 1 and the punch 2 are vertically lowered, the punch punching a hole into the tape 9 on the die plate in a downward working stroke of length *h*. The punch 2 is received into a hole 8 in the die plate 7. The diameter of the hole 8 in the die plate is of appropriate size to accommodate the punch and to allow for misalignment. If the size of the hole is not to be substantially larger than the size of the punch, in which case the punch will not cut a clean hole into the tape, the possible extent of misalignment must be reduced. However, this can be done only by providing rigidity of lateral location of the system of punches, that is to say by providing a leaf spring suspension of sufficient lateral rigidity. It will therefore be understood that an improvement in the lateral rigidity of the spring suspension of the punches in the system is of primary importance, and this is the principal aim of the present invention. How this is achieved by the present invention will now be described in greater detail by reference to FIG. 3 of the drawings.

As shown in FIG. 3, each punch holder 1 and 1′ and hence each punch 2, 2′ is attached to and guided by four leaf springs forming two pairs, viz., 11, 12, 13, 14 and 11′, 12′, 13′, 14′ respectively. Each pair (11, 12; 11′, 2′; 13, 14; 13′, 14′) when viewed perpendicularly to the tape 3 or to the face of the die plate 7 (i.e., in plan) forms a V with its apex located at the punch holder 1 or 1′ and its diverging ends located at the fixing block 6. Viewed from the side (in elevation) the two springs of a pair forming a V (e.g., 11 and 12) are relatively spaced a vertical distance *x*, *x* being at least equal to the length *h* of the stroke of the punch (FIG. 2) ($x \geq h$). This ensures that whenever a punch is depressed the flexed springs will not make contact with the unflexed springs associated with the punches that are not depressed, and that there can be no mutual interference between different pairs of springs. It will be readily understood that the vertical distance *y* between different pairs of springs (i.e., the distance between the two most closely neighbouring springs of different pairs) must likewise be at least equal to $h (y \geq h)$.

If the pairs of leaf springs associated with one of the punches and their points of fixation are viewed in plan it will be understood that the suspension substantially comprises two vertically superimposed "delta" structures which, as is known from the theory of mechanical structures, are laterally extremely rigid. The relative spacing of the springs in the vertical does not significantly affect the stability of the arrangement.

Moreover, viewed from the side (in elevation) it will also be understood that irrespective of the number of punches, all the leaf springs will be contained in four different parallel planes. In the illustrated embodiment the leaf springs 11 and 11′, 12 and 12′, 13 and 13′, 14 and 14′ each lie in a plane parallel to the planes in which the produced and assembled in a particularly simple way which is illustrated in FIG. 4. It will be seen that the leaf springs 11, 11′ . . . $\mathbf{11^{IX}}$; 12, 12′ . . . $\mathbf{12^{IX}}$, which are coplanar, are all integral with a back 14 and 15 respectively in the form of a comb. The backs 14, 15 of the combs may then be used for affixing the systems of springs to their rigid support means. The combs may be conveniently produced from a blank in a single stamping operation, a suitable material for the blank being the alloy known under the registered trademark "Invar," i.e., an iron nickel alloy based on a composition of 36% nickel and 64% iron. This material is known to possess a low coefficient of thermal expansion and, by its employment, movement of the punches in relation to the die plate due to the thermal effects can be minimised. This effect will be further improved if the die plate 7 itself (FIG. 2) is likewise made of "Invar."

In the arrangement illustrated in FIG. 4, only every second leaf spring (11, 11″, $\mathbf{11^{IV}}$ . . . 12, 12″, $\mathbf{12^{IV}}$ . . .) is integrally attached to one back 14 or 15 respectively, whereas the other springs (11′, 11‴, $\mathbf{11^{V}}$ . . . 12′, 12‴, $\mathbf{12^{V}}$ . . .) are parts of separate combs having back 14′ and 15′ respectively. This facilitates the production of the combs since otherwise the stamping operation would be somewhat difficult in view of the close spacing of neighbouring leaf springs, which amounts to only a few thousandths of an inch. However, the two combs 14 and 14′ as well as 15 and 15′ are of identical configuration and if suitably superimposed so that their leaf springs are relatively offset by the centre distance between neighbouring springs the two combs will combine to form a compact assembly comprising leaf springs all substantially contained in one plane.

If the two pairs of combs 14, 14′ and 15, 15′ are then moved along the horizontal lines 16 until the backs of the combs are in alignment perpendicularly to the die plate, but separated by an intervening vertical distance *x*, they will then form V-shaped pairs of springs similar to those described with reference to FIG. 3.

Whereas in the embodiment illustrated in FIG. 3 two pairs of leaf springs are associated with each punch, the number of pairs may be increased to three and more pairs of leaf springs forming V's, as may be desired. Generally speaking, *n* pairs of leaf springs are used, where *n* is a number equal to or exceeding 2. The several leaf springs will then occupy one of $2n$ planes and coplanar leaf springs will be parallel.

Figure 5A:
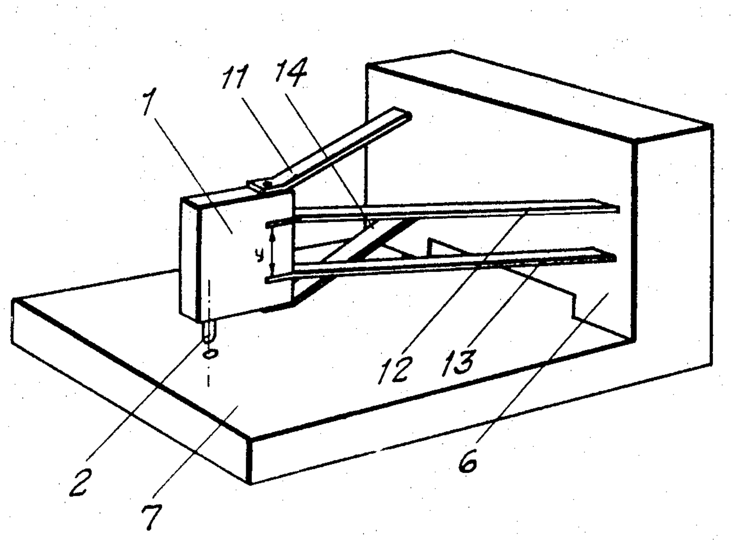

It is not a matter of consequence which of the two springs of a pair forming a V is located nearest the die plate. Whereas in the embodiment according to FIG. 3 the disposition of the two pairs of springs is identical (the leaf springs of each pair nearest the die plate both being the right hand springs of the V's), their disposition in the embodiment shown in FIG. 5*a* is relatively opposed, a modification which does not substantially affect the lateral rigidity of the suspension of each punch. In the arrangement depicted in FIG. 5*a*, the leaf springs 12 and 13, which each form a pair with the leaf springs 11 and 14 respectively, align in the vertical, their relative spacing y exceeding the length of the stroke of the punch.

Figure 5B:
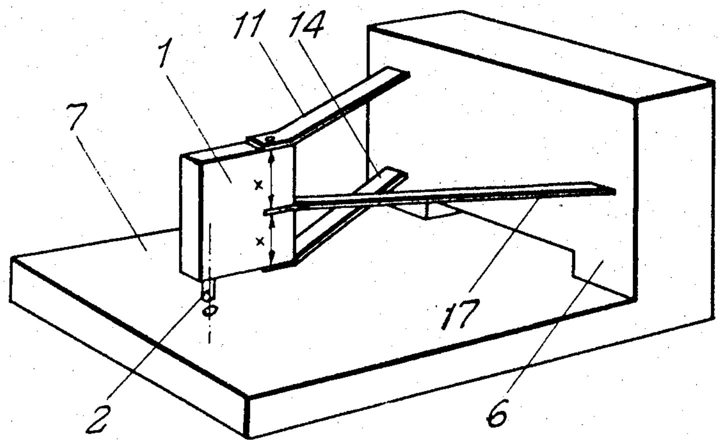

Finally, FIG. 5*b* represents a modification of the arrangement according to FIG. 5*a* inasmuch as the two leaf springs 12 and 13 are combined in a single leaf spring 17. This leaf spring 17 is therefore paired with each of the two other leaf springs 11 and 14.

It will thus be understood that an odd number of leaf springs may be employed, always provided $x \geq h$ and that the relative spacing of neighbouring leaf springs exceeds or is at least equal to the length of the punch stroke.

As already explained, the proposed disposition of the springs permits the lateral clearance of the punches inside the holes of the die plate to be substantially reduced. An even further reduction can be achieved if the rigid support means of the spring system or the assembly of springs itself is inclined in relation to the face of the die plate. This is a feature which is also applicable to punch suspensions of a type other than that herein proposed. It is illustrated in FIG. 6 which shows a suspension for punches located above a tape that is to be punched. All the leaf springs 4, 5 . . . comprised in this suspension are directed from their points of fixation at an upward angle $\alpha$ to the plane of the die plate or to the horizontal H, and the magnitude of this angle is so chosen in relation to the length of the punch stroke $h$ and the free length R of the springs that at a level E of the punch 2 inside the hole 8 in the die plate the tanget T to the path B (of a point B) on the punch is parallel to the axis MA of the hole in the die plate, that the punch axis SA is parallel to the axis of the hole in the die plate irrespective of its position in said path $\overline{B}$, and that both axes SA and MA coincide at said level inside said hole. If the spring suspension is located on the under side of the die plate the arrangement is simply mirror reversed.

We claim:

1. A tape punching mechanism, comprising at least one punch member, a die plate formed with as many holes as there are punch members, each hole being intended to receive a respective punch member, support means associated with said die plate, and leaf spring means attached between said support means and each punch member and movably mounting each punch member at a location where it can cooperate with its respective hole in said die plate, said leaf spring means for each punch member comprising at least two pairs of leaf springs of which each pair, when viewed in a direction substantially perpendicular to the die plate forms a V diverging from said punch member to the points of attachment to said support means, and all said leaf springs being spaced apart from one another in the direction of movement of the punch member by a distance which is at least equal to the length of the working stroke of the punch member.

2. A mechanism as claimed in claim 1, wherein at least two punch members are disposed in a row across said die plate for punching holes in a tape intended to pass between said punch members and said die plate, and wherein corresponding leaf springs associated with different punch members lie in substantially the same plane.

3. A mechanism as claimed in claim 2, wherein the distance between the points of attachment to the support means of each of said pairs of leaf springs exceeds the centre distance between neighbouring punch members.

4. A mechanism as claimed in claim 2, wherein the relative spacing of neighbouring leaf springs associated with different spring pairs exceeds the length of the working stroke of said punch member.

5. A mechanism as claimed in claim 2, wherein said springs contained in the same plane are integral parts of a comb and the back of said comb is rigidly clamped to said support means.

6. A mechanism as claimed in claim 5, wherein said comb is an integral stamping punched out of a sheet metal blank.

7. A mechanism as claimed in claim 5, wherein alternate springs of a set of springs contained in said same plane form parts of a first comb which is combined with a second comb comprising the remaining springs of said set by superimposing said two combs relatively displaced by the centre distance between neighbouring punch members and thereby forming a complete comb member.

8. A mechanism as claimed in claim 5, wherein said comb as well as said die plate are made of "Invar."

9. A mechanism as claimed in claim 2, wherein said corresponding leaf springs contained in odd-numbered planes are all relatively parallel and wherein said corresponding leaf springs contained in even-numbered planes are likewise relatively parallel.

10. A mechanism as claimed in claim 2, wherein said corresponding leaf springs contained in a first and fourth as well as in a fifth and eight plane are all parallel, and wherein said corresponding leaf springs contained in a second and third as well as sixth and seventh plane are likewise parallel, when viewed in a direction perpendicular to said die plate.

11. A mechanism as claimed in claim 10, wherein said leaf springs contained in said second and third planes are combined into one single leaf spring and said leaf springs contained in said sixth and seventh planes are likewise combined into one leaf spring, so that the number of said leaf springs comprised in the suspension of one of said punch members is an odd number equal to at least three.

12. A mechanism as claimed in claim 11, wherein the spacing of neighbouring leaf springs in the direction perpendicular to said die plate exceeds the length of the working stroke of said punch.

13. A mechanism as claimed in claim 2, wherein all said leaf springs associated with all said punch members are inclined at an angle to the plane of said die plate the magnitude of said angle being determined by reference to the length of the working stroke of said punch member and the free length of said springs in such manner that when the punch member has descended to given level into its hole in said die plate the tangent of its path of motion is parallel to the axis of said hole, the axis of said punch being at all times parallel to the axis of said hole and the two latter axes coinciding when the punch has descended to said level.

References Cited

UNITED STATES PATENTS

| | | | |
|---|---|---|---|
| 1,907,256 | 5/1933 | Freeman | 83—542 |
| 3,130,620 | 4/1964 | Smeets | 83—542 X |
| 3,234,840 | 2/1966 | Smeets | 83—698 X |

FRANK T. YOST, *Primary Examiner.*

U.S. Cl. X.R.

83—559, 698; 234—131